(12) United States Patent
Ehrlich

(10) Patent No.: US 11,905,045 B1
(45) Date of Patent: Feb. 20, 2024

(54) DEPLOYABLE IMPACTOR PAYLOAD

(71) Applicant: Lockheed Martin Corporation, Bethesda, MD (US)

(72) Inventor: Joshua William Ehrlich, Denver, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 59 days.

(21) Appl. No.: 17/348,624

(22) Filed: Jun. 15, 2021

Related U.S. Application Data

(60) Provisional application No. 63/061,272, filed on Aug. 5, 2020.

(51) Int. Cl.
*B64G 4/00* (2006.01)
*B64G 1/62* (2006.01)
*B64G 1/22* (2006.01)

(52) U.S. Cl.
CPC ............... *B64G 4/00* (2013.01); *B64G 1/222* (2013.01); *B64G 1/62* (2013.01)

(58) Field of Classification Search
CPC ...................................................... B64D 47/08
See application file for complete search history.

(56) References Cited

U.S. PATENT DOCUMENTS

| | | | | |
|---|---|---|---|---|
| 5,897,223 | A * | 4/1999 | Tritchew | G02B 27/644 348/144 |
| 7,000,883 | B2 * | 2/2006 | Mercadal | F16M 11/18 396/428 |
| 8,140,200 | B2 * | 3/2012 | Heppe | B64D 7/00 701/16 |
| 9,348,197 | B2 * | 5/2016 | Lewis | F16M 11/043 |
| 2012/0301130 | A1 * | 11/2012 | Shi | H01F 7/06 396/428 |
| 2017/0227162 | A1 * | 8/2017 | Saika | F16M 11/121 |

\* cited by examiner

*Primary Examiner* — Tien Q Dinh
*Assistant Examiner* — Nevena Aleksic

(57) ABSTRACT

Provided herein are various enhanced systems, apparatuses, and techniques for on-surface analysis of celestial or terrestrial surfaces, such as for discovery and analysis of water ice deposits, locations, abundances, and depths. An example herein includes a swarm of spherical payloads sequentially deployed by a deployment host across a large area of a surface to impact the surface, sense properties of the surrounding environment using avionics and scientific instrumentation, and to establish a communication network to collect and transmit collected data.

7 Claims, 9 Drawing Sheets

DEPLOYABLE IMPACTOR PAYLOAD

RELATED APPLICATIONS

This application hereby claims the benefit of and priority to U.S. Provisional Patent Application No. 63/061,272, titled "LUNAR PROSPECTING PAYLOAD SWARM," filed Aug. 5, 2020, which is hereby incorporated by reference in its entirety.

TECHNICAL BACKGROUND

Despite several crewed and robotic missions to Earth's moon, knowledge of abundance and distribution of local resources, such as water ice, on the lunar surface is still limited. In the absence of human presence on the moon, discovery and access to water ice deposits on and below the lunar surface can be accomplished by robotic exploration missions. However, these missions are very costly, schedule intensive, and each can only provide access to a limited region. Missions for exploring the lunar regolith for traces of water have been conducted successfully since the 1960s, however the scope for which these spacecraft have been designed to carry out have been constrained to exploring only select locations. Because of these limitations, traces of water on the lunar surface have been generalized while the ability to access vast stretches of the lunar landscape has not successfully been fulfilled to this day. These technologies have been deployed to just a handful of locations, as well their duration for exploring have been limited to no more than just a couple of weeks, at most. Remote spacecraft (e.g., Chandryann-1) and impactor spacecraft (e.g., LCROSS) have also been successful in defining locations of ice within the lunar soil, but this data is limited to the general area where the telemetry was collected. Resource Prospector was planned to be NASA's first true prospecting mission for searching and confirming water on the surface of the Moon, however it was cancelled. NASA has a mission planned to visit the lunar south pole directly (called VIPER), however this robot will be limited in accessing multiple areas of interest due to its weight, size, and mobility. In addition, several CubeSat form factor probes (Lunar Flashlight, Lunar IceCube, LunIR) can remotely scan the lunar poles and permanently shadowed regions (PSRs) for a limited amount of time and range. While claims suggest the confirmation of water being present on the moon is true, the catalytic effect of previous spacecraft exploring the lunar environment and promoting in-situ resource utilization (ISRU) on the surface has been delayed.

Since SPD-1 in 2017, significant focus and investment has been made in the U.S. sending the "first woman and next man" back to the Moon. For example, the Artemis Program includes building "sustainable elements on and around the Moon" such as landers, rovers, orbital, and surface habitation. Recently, NASA and U.S. government released several documents outlining the need to use and secure the Moon's resources, which include White House Executive Order 13914, NASA Plan for Sustained Lunar Exploration and Development, and the Artemis Accords. NASA has significant interest in the terrain and resources at the lunar south pole. The U.S. Department of Defense has expressed interested in supporting NASA's return to the moon and overall cis-lunar space situational awareness. No prospecting missions to explore large (~4 km$^2$) lunar regions are currently manifested.

Lunar ground truthing missions are needed as a precursor to in-situ resource utilization (ISRU) and human sustainability. Thus, many public and private space entities have now turned their focus onto the moon, including prospecting of lunar resources to set up a sustainable lunar architecture that will support a human deep space presence for long duration. Water on the lunar surface can support space travel and habitation including rocket propellant and consumables (e.g., hydrogen, oxygen, and liquid water). However, tools for exploration and scientific discovery are still limited that allow for on-surface analysis of water ice deposits, locations, abundances, and depths across the lunar surface.

OVERVIEW

The description herein provides improvements to systems and apparatuses that allow for on-surface analysis of planetary or celestial surfaces, such as for discovery and analysis of water ice deposits, locations, abundances, and depths thereof. Discussed herein is a payload swarm of spherical probes for collecting surface-based telemetry for mapping lunar ice deposit locations at various areas of interest on the moon. Deployment of swarm payloads provides scientific coverage on the lunar surface, or other terrestrial surfaces, and delivers data for pinpointing definitive locations of lunar water ice. The deployed payload not only extends data coverage of an explored site, but also provides redundant means of communication and exploration in the event of single or multiple payload failures experienced during the mission. By keeping costs down, the opportunity to launch multiple fleets without incurring significant costs can be achieved compared to more expensive orbital and surface robotic missions.

One example implementation includes an apparatus comprising an outer shell comprising an aperture, an impact structure internal to the outer shell configured to resist impact onto a surface, and a sensor assembly protected from the impact by the impact structure and configured to rotate about at least one axis within the outer shell to align a sensor component with the aperture after the impact. The sensor component can be configured to sense properties external to the outer shell through the aperture.

Another example implementation includes a system comprising a plurality of probes. The probes are configured to detect an impact onto a surface after deployment from a deployment host. Responsive to detecting the impact, the probes are further configured to establish a communication network among the probes, sense one or more properties of the environment surrounding the probes, and transfer indications of the one or more properties for delivery to a collection node over the communication network.

In yet another example, a method is provided. The method comprises deploying from a deployment host in-flight for impact onto a surface, and responsive to detecting the impact, determining a status of at least a power source and nominal probe health & status. The method further comprises establishing a communication network with at least one or more receivers located on the surface, sensing one or more properties of an environment of the surface, and transferring indications of the one or more properties for delivery to at least one among the one or more receivers and the deployment host over the communication network.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
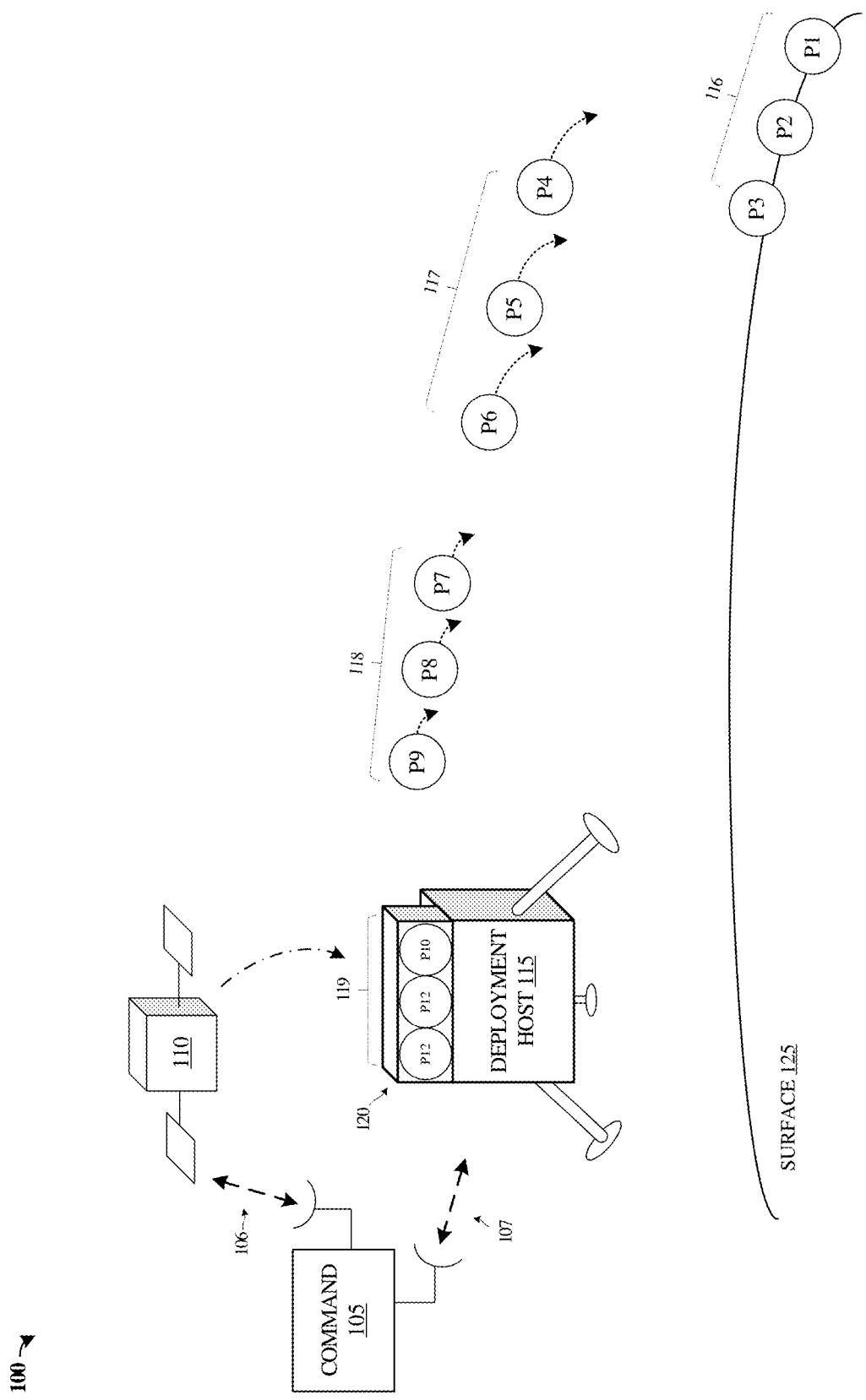
FIG. 1 illustrates an exemplary operating environment demonstrating a distribution of a payload swarm in an implementation.

Discussed herein are several enhanced systems and apparatuses related to sequential deployment of spherical payloads for on-surface analysis of a celestial body. The payloads provide for discovery and analysis of water ice deposits, locations, abundances, and depths. One example herein includes a swarm of spherical probes, using cost-effective commercial off-the-shelf (COTS) items, to find water ice deposits on the lunar surface without the increased risks and costs compared to past and currently manifested lunar payloads.

The examples herein include spherical payload designs that comprise avionics, batteries, scientific instrumentation, and communications hardware needed to successfully achieve its mission. These payloads can be distributed across various areas of interest on a terrestrial surface, the lunar surface, or surface of a celestial body for the purpose of delivering data related to the surface. For example, when deployed to the lunar surface, the payloads can detect and report on the spatial distribution of water ice deposits. Each payload can provide data to a collection node over X/S-band communications or WiFi, which might include communication with other payloads acting as a swarm, as well through other lunar surface and/or orbital assets, if available. The collection node may be located in lunar orbit, near Earth, space stations, or other locations remote from the payloads themselves. Scientific instrumentation is housed within each payload, designed to detect water ice, among other properties, which can be achieved through surface impact telemetry, direct surface ground penetrating radar, spectrometry, and ultrasonic imagery, among other telemetry sources. The included instruments can vary based on size of the payloads and data needed for each deployment. These payloads can be deployed in time-constrained missions to various sites on the Moon, including lunar maria, highlands, and shallow craters, and permanently shadowed regions (PSRS) during an orbital, landing, landed and mobile mission phase.

The payloads, referred to as probes, can be delivered by a canister structure. Although variations are possible, this canister structure can have a similar external form factor to that defined by the CubeSat standard. The canister structure can provide storage, deployment, and payload activation mechanisms needed to support the overall mission. The canister structures can comprise COTS structural components, or they can comprise custom-made components based on mission objectives. The canister structures include deployment mechanisms needed to support the deployment of the payloads following the deployment of the canister structure from a large-scale deployer. Small-scale avionics components may also be installed, depending on communications and other means for achieving the mission. The canister structure can be permanently secured in the deployer to support probe deployment. The canister structures can be housed in a variety of orientations inside a main deployer, driven by an intended distribution pattern onto a lunar area of interest. These canister structures can also be designed to various lengths, allowing for single to multi-payload deployments across various platforms, such as CLPS landers, fly-by spacecraft, Orion, Gateway, human lunar landers, and the like. The deployer may be comprised of COTS hardware, proven through various deployment environments, such as host spacecrafts, ISS, *Cygnus*, launch vehicles, and the like. The canister structures can be sized to fit in existing commercial deployers, offering both various orientations and payload swarm sizes for exploring the lunar surface. The commercial deployers can be installed and initiated on-board various launch vehicles (e.g., rocket upper stages) and missions flying by and directly to the moon, such as deep space missions, CLPS, Human Landing System, Gateway, Orion, and the like. When employed in terrestrial settings, the deployers and host vehicles can comprise various aircraft, drones, unmanned aerial vehicles (UAVs), rockets, missiles, or other airborne devices, as well as stationary or mobile surface-based launch systems.

One example implementation includes a spherical payload apparatus. The apparatus comprises an outer shell comprising an aperture, an impact structure internal to the outer shell configured to resist impact onto a surface, and a sensor assembly protected from the impact by the impact structure and configured to rotate about at least one axis within the outer shell to align a sensor component with the aperture after the impact. The sensor component can be configured to sense properties external to the outer shell through the aperture. In an exemplary system, several of the aforementioned payloads can be employed to form a "swarm" of probes. For instance, a system can comprise a plurality of probes, wherein the probes are configured to detect an impact onto a surface after deployment from a deployment host. The probes, after detecting the impact, may be further configured to establish a communication network among the probes, sense one or more properties of the environment surrounding the probes, and transfer indications of the one or more properties for delivery to a collection node over the communication network.

Turning now to the Figures, FIG. 1 illustrates an exemplary operating environment 100 demonstrating a distribution of a payload swarm onto a surface. Operating environment 100 includes command 105, host spacecraft 110, deployment host 115, payload groups 116-119, and surface 125. Deployment host 115 further comprises one or more of probe deployer assemblies (i.e., canister 120) whereby to house and deploy each of payload swarms 116-119.

In operation, command 105 communicates with host spacecraft 110 and/or directly with deployment host 115 via wireless communication link 106 and communication link 107, respectively to provide mission commands Command 105 may be a ground station or control center on Earth, a command hub in near-Earth orbit, or some other remote hub. Mission information transmitted from command 105 can comprise a deployment schedule and location, velocity targets, information about surface 125, and the like. To begin, host spacecraft 110 can launch deployment host 115 towards surface 125 to begin the deployment mission according to the mission information. Deployment host 115 can be a lunar landing vehicle comprising a set of deployer assemblies or some other vehicle configured to deploy a payload. The deployer assemblies can be configured to deploy payload(s) for distribution onto a large area of a scene, such as surface 125, which may include a lunar surface, planetary surface, or another celestial surface.

A payload swarm comprises a group of spherical probes, such as payload groups 116-119. In an embodiment, each of payload groups 116-119 comprises at least one to three spherical probes packed into a single canister or housing mechanism, such as deployer assemblies or canisters (i.e., canister 120) which may house up to a dozen probes altogether. Canister 120 can include a cylindrical sleeve to hold the spherical probes and a rectangular frame to conform to dimensions of a CubeSat form factor. The CubeSat form factor typically has unit-based sizing, such as 1 U, 2 U, 3 U, 6 U, or 12 U multiplies of a 10 centimeters (cm)×cm×10 cm envelope, and a unit mass of 1-2 kilograms. CubeSat devices can be packed into deployment host 115 which can deploy the CubeSat devices once triggered. Example deployers for CubeSat devices include Poly-Pico Orbital Deployer (P-Pod) that can contain many CubeSat devices in a 34 cm×10 cm×10 cm envelope that houses three 1U CubeSat devices. P-Pods can be mounted to launch vehicle. Double-sized P-PODs are possible. Other deployment mechanisms include NanoRacks CubeSat Deployer (NRCSD), ISIPOD (Innovative Solutions in Space—ISIS), ISIS 6-Pack, EZPOD, and others. It may be appreciated that other forms and arrangements of the canisters and probes can be achieved.

Each probe deployer can be inserted into deployment host 115 or a deployment mechanism on or inside deployment host 115, or they can be mounted to a chassis or frame of deployment host 115. In various embodiments, deployment host 115 individually deploys each deployer assembly towards surface 125 per the deployment schedule. After release, each assembly can be triggered to deploy the spherical probes housed inside all at once or sequentially. Each assembly can remain mounted or inserted in deployment host 115 and release each of its probes directly from deployment host 115.

By way of example, payload group 116, including spherical probes P1, P2, and P3, can be deployed from deployment host 115 and its respective deployer assembly first. Then, payload group 117, including spherical probes P4, P5, and P6, can be deployed at a time after payload group 116. Each spherical probe in its respective payload group can further be deployed together or individually at different times to increase the amount of area covered on surface 125. Accordingly, spherical probe P1 may travel a further distance than P2, P3, and so on. Each probe can be distributed across surface 125 wherein the initially deployed payload (e.g., payload group 116) lands farthest from deployment host 115 and the last deployed payload (e.g., payload group 119) travels the shortest distance and remains closest to deployment host 115. Once each probe has impacted on surface 125, the probes can establish a communication network with one another and/or deployment host 115 for wireless transmission, data transfer, and more. Deployment host 115 may be able to communicate directly with host spacecraft 110, command 105, or some other communication hub. While FIG. 1 illustrates deployment host 115 in descent towards surface 125, some embodiments provide for deployment from deployment host 115 after deployment host 115 has landed on surface 125.

Each spherical probe of the payload swarm is designed to survive a high-velocity impact on surface 125. During descent following a release from deployer assembly, the probes can collect images and optical data to obtain terrain mapping, soil strength properties, and the like. The spherical probes may land in craters, PSRs, and other environments on surface 125 where each probe can achieve a specific scientific focus. Each spherical probe comprises one or more sensors, scientific instruments, cameras, and other avionics components to capture data about surface 125 and surrounding environments. For example, spectroscopy measurements can be taken to identify lunar water ice and rare earth metal signatures. Dielectric measurements can be taken to define lunar regolith oxides such as $TiO_2$, FeO, and $H_2O$. Global lunar temperature readings can be taken in shadowed, cratered regions, and in buried soil deposits.

Each payload group 116-119 can be deployed via a deployment schedule to allow for minimal deployer ΔV (e.g., 2 m/s) while still maintaining a maximum range (e.g., 1 km) from a target landing site. The farthest landing site available may be determined by a maximum allowable impact velocity (e.g., 320 m/s) of a first group, so a trajectory and project landing site of each deployed group can be determined. For example, the deployment schedule can enable a first release of payload group 116 while deployment host 115 descends and is approximately 45 degrees with respect to surface 125. Deployment host 115 can sequentially release each subsequent payload group at an interval of fourteen seconds. Each payload group can impact surface 125 at lower velocities than the previous group given a shortened distance to impact. It may be appreciated that other deployment schedules and trajectories can be implemented for distribution of the swarm.

Advantageously, a distributed deployment of a payload swarm enables application to extreme environments and autonomous operations for future impactor missions. A payload swarm can collect various sets of scientific data across large, complex regions using a multi-suite of instruments embedded within the swarm. The swarm provides a low-cost cutting-edge approach for collecting ground truth data in deep space through a producible, scalable payload design. Furthermore, the swarm can expand to a variety of terrestrial applications, including military operations, scientific field work, remote data sensing, and first aid.

Figure 2:
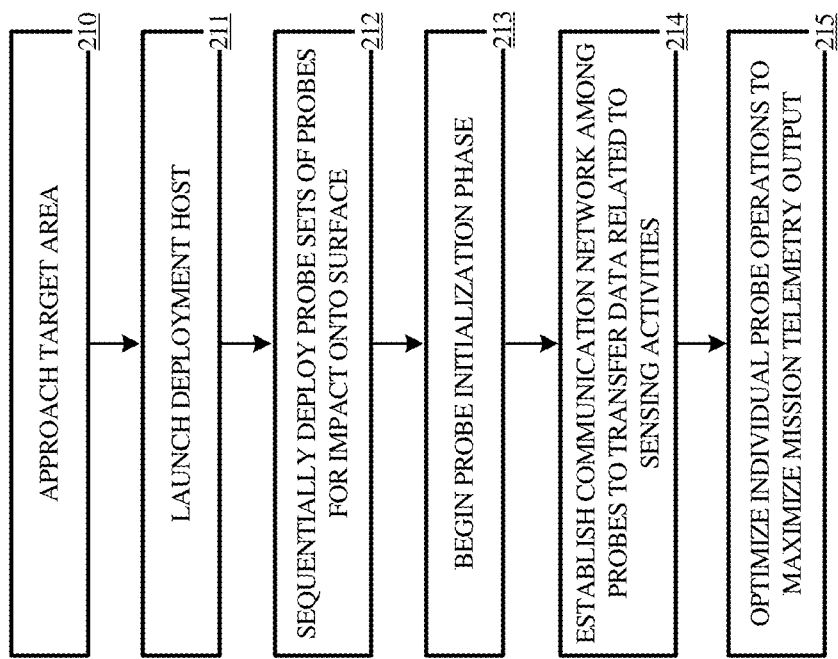
FIG. 2 illustrates a method of deploying a payload swarm and establishing a communication network between the swarm in an implementation.

Moving to FIG. 2, FIG. 2 illustrates a method of deploying a payload swarm, such as payload groups 116-119 of FIG. 1, and establishing a communication network between the swarm in an implementation. FIG. 2 includes operations 200 noted parenthetically in the discussion below and which reference elements of FIG. 1.

In operation 210, host spacecraft 110 approaches (210) a target area, such as surface 125. Prior or concurrently to approaching surface 125, host spacecraft 110 can communicate with command 105 via communication link 106 whereby command 105 directs host spacecraft 110 towards surface 125 and provides mission information and parameters. In an instance, mission parameters comprise a deployment schedule and timing sequence for releasing the payload, projected impact trajectories and velocities of each spherical probe in the payload swarm, altitude and velocity parameters for host spacecraft 110, and the like.

Next, in operation 211, host spacecraft 110 launches (211) a deployment host, such as deployment host 115, towards surface 125. Deployment host 115 can communicate directly with command 105 and/or host spacecraft 110 via a wireless communication link to obtain mission information and parameters. Alternatively, deployment host 115 may obtain and store mission information and parameters on computer-readable storage media onboard deployment host 115. Deployment host can comprise one or more probe deployer assemblies containing the sets of spherical probes. The deployer assemblies may be housed inside deployment host 115 or they can be mounted to deployment host 115.

In operation 212, deployment host 115 sequentially (212) deploys sets of spherical probes (e.g., P1, P2, P3, and so on, of FIG. 1) for impact onto the surface of surface 125 via the one or more deployer assemblies. First, each deployer assembly (i.e., deployer assemblies 120 and 121 of FIG. 1) can be deployed from deployment host 115 sequentially. Then, each deployer assembly can be triggered to release its set of probes at different times in an effect to maximize spatial distribution. Alternatively, each deployer assembly can be individually launched from deployment host 115, then the sets of probes can be released at the same time at a trigger time. The deployer assemblies can include a deployment mechanism to release the probes, such as a spring-loaded pusher or other mechanical apparatus. In another instance, the deployer assemblies can remain in or on deployment host 115 where the sets of probes can be sequentially deployed from. In yet another instance, the sets of probes can be deployed from deployment host 115/the deployer assemblies after deployment host 115 has landed on surface 125.

Following impact on surface 125, the payload swarm of probes can begin (213) probe initialization phase. During this phase, each probe can self-report its health and status, as well any effect on equipment and operations. The probes start up communications and scientific instruments, among other equipment, and attempt to communicate with any other nearby probes and/or the deployment host 115 by broadcasting signals using an onboard antenna. As a probe receives a signal from another probe, the receiving probe can acknowledge the signal and respond to the transmitting probe. Eventually, the swarm establishes (214) a communication network among the active probes to transfer status and data related to sensing activities.

The communication network can comprise a mesh network involving at least one or more probes and deployment host 115. The probes and deployment host 115 can communicate via X-band, S-band, WiFi or other frequency range to transmit and receive data regarding mission objectives, probe operations, probe status, and the like. In various embodiments, each probe may comprise one or more sensors, cameras, scientific instruments, batteries, and a processing system. Each probe is configured to capture data of surface 125, such as surface or soil characteristics, thermal data, airborne data, and more.

Finally, in operation 215, the probes can optimize (215) individual probe operations to at least maximize mission telemetry output. Each probe can autonomously sever connection due to end of life or failure of individual probes with one or more other probes of a set via the communication network. As a probe becomes inactive, other probes may take over collection operations in place of the inactive probe, for instance. In other instances, the other probes can increase communications operations. Thus, each probe can change its individual operation to satisfy overall mission objectives and provide telemetry data for downstream use. In one example, a probe (e.g., P1) of the payload swarm (e.g., payload group 116) may fail or become unreachable upon impact on the surface. When attempting to establish (214) the communication network, the other probes can determine an indication of unresponsiveness of the failed probe and create the network without it. In another example, a probe (e.g., P2) of the payload swarm (e.g., payload group 116) can lose power after a time, and therefore, lose connection to the communication network. Other probes in the network can determine the inactive probe's status and reroute any communications accordingly. In a further example, a probe (e.g., P3) of the payload swarm (e.g., payload group 116) can be unreachable by some of the probes via communication links, but other probes with a line of sight, for instance, can function as a relay point for the probe to keep its data accessible in the network. Therefore, the communication network can still function because P3's data can be passed to other probes and/or the deployment host 115. Rerouting communications based on probe status allows the payload swarm to at least continue collecting and communicating telemetry data even after a number of failures throughout the mission timeline.

Figure 3:
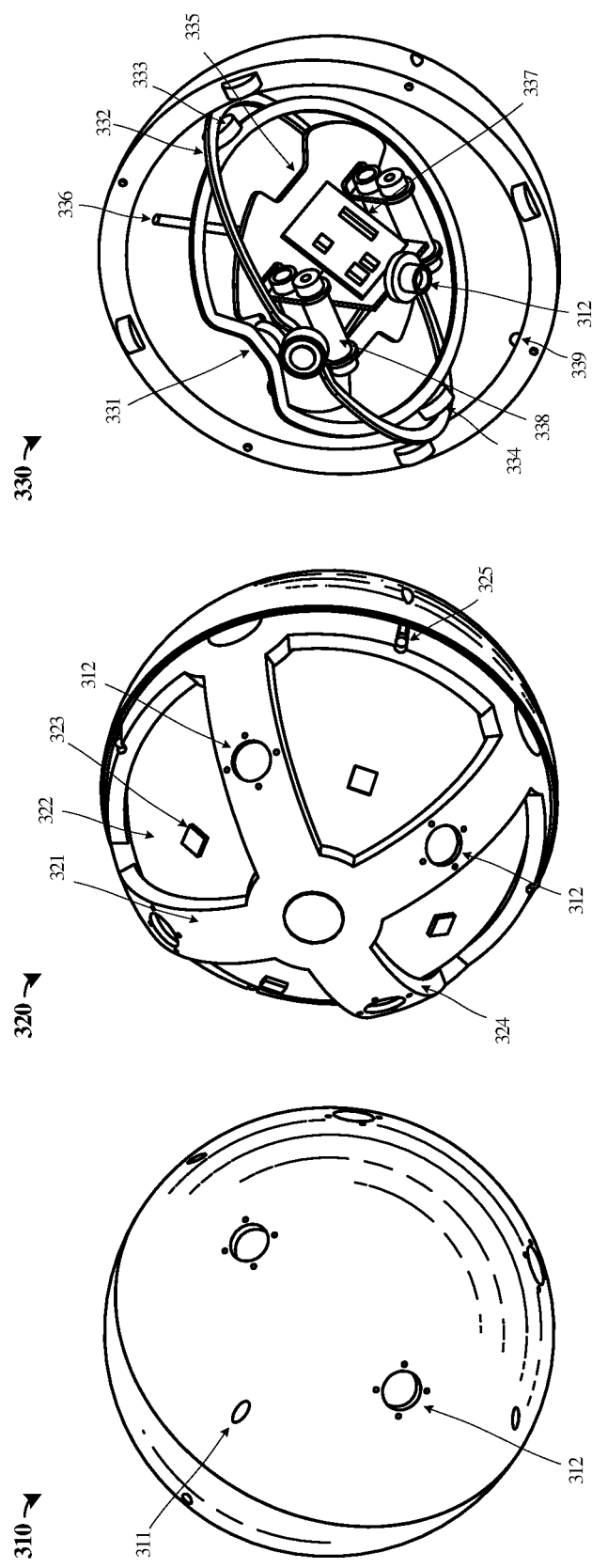
FIG. 3 illustrates exemplary structural aspects of a spherical probe of a payload swarm in an implementation.

FIG. 3 illustrates exemplary structural aspects of a spherical probe of a payload swarm used in an implementation. FIG. 3 includes outer shell aspect 310, internal shell aspect 320, and internal design aspect 330. Outer shell aspect 310 further includes a view of the outside of the spherical probe formed by two shells held together by fastener 311 and multiple viewports 312. Internal shell aspect 320 further includes a view of the layer below the outer shell with an impact absorption material 321, a two-piece shell 322, grounding paths 323, a crushable sub-structure 324, and an internal fastener 325. Internal design aspect 330 further includes rotatable support frames 331 and 332, gimbals passthroughs 333 and 334, center plate 335, omni-directional patch antenna 336, instrumentation components 337, batteries 338, and magnetic centering mechanism 339.

The spherical probes have a hardened outer two-piece shell, connected by one or more of fastener 311, for reinforced impact protection. The probes further comprise science instrument viewing window structures, such as viewport 312, that protect the avionics and science instruments inside against surface impact loading and environment intrusion (thermal, soil, etc.) while providing viewing capabilities for collecting science telemetry and data on the celestial body regardless of the sphere's orientation. In various embodiments. the outer shell is formed by a multi-ply shell. In other instances, the outer shell can be formed by another element, alloy, or impact-hardened material to withstand a high-velocity impact on a surface. Each of viewport 312 can be created with a polyurethane material or some other type of protective, transparent material.

Beneath the outer shell, the spherical probe comprises an internal exoskeletal frame that supports and transfers high impact loads experienced at landing (both initial impact and follow-on impacts caused by bouncing and/or rolling), ensuring avionics, electricons, and science instrument suite protection, and thus, extending mission and science-gathering accessibility on the surface. As shown in internal shell aspect 320, the probe comprises an impact absorption material 321 made from a reinforced metallic/polymer material, such as a titanium alloy or the like. A crushable sub-structure (e.g., honeycomb) 324 can be configured within the impact absorption material 321 for anti-stress propagation upon impact. Also located on/within the impact absorption material 321 are internal layers of viewports 312 to maintain visibility between the science instruments and the surface through each layer of the probe. For further reinforcement, a two-piece shell 322 provides an additional layer of protection to the internal electronics. Both the two-piece shell 322 and impact absorption material 321 are held in place and secure internal components via one or more internal fasteners 325. Both shells can also be secured via a platform, like center plate 335, seated in the middle section of the probe. Ground paths 323 located on two-piece shell 322 function as electrical ground points for internal components discussed in aspect 330 below.

Beneath each protective layer shown in aspects 310 and 320 lies various science instrumentation components 337, other electronics, and further internal structural support frames for meeting higher-than-expected landing loads and for aligning internal components located on center plate 335 through window structures (e.g., viewport 312). The spherical probes comprise rotatable support frames 331 and 332 that allow for gyroscopic-like rotation about at least one axis no matter the orientation the probe lands in after impact. The internal gyroscopically-actuated internal frame/structure promotes passive self-righting during flight and landing mission phases to direct sensor and science instrument positioning for accurate telemetry collections. This is additionally achieved by magnetic centering mechanism 339 that helps guide the internal components with a preferred orientation. As the internal components move about via the rotatable structure, gimbals passthroughs 333 and 334 alleviate any wire crossing or tangling to mitigate electronic failure or damage.

In operation, instrumentation components 337 are powered by batteries 338 to perform mission capabilities. Instrumentation components 337 can comprise a suite of devices such as sensors, cameras, and other scientific instruments configured to record and obtain data about the surface. The probes can support aiming of communications equipment (e.g., transmitters and receivers) using omni-directional patch antenna 338 to achieve data uplink/downlink through the swarm following impact on the surface. In some representations, rotatable support frames 331 and 332 align the internal probe components in an upright position wherein omni-directional patch antenna 338 is positioned at the top of the sphere to ensure maximum communication range. It may be appreciated that other orientations of components and support structures can be configured.

Figure 4:
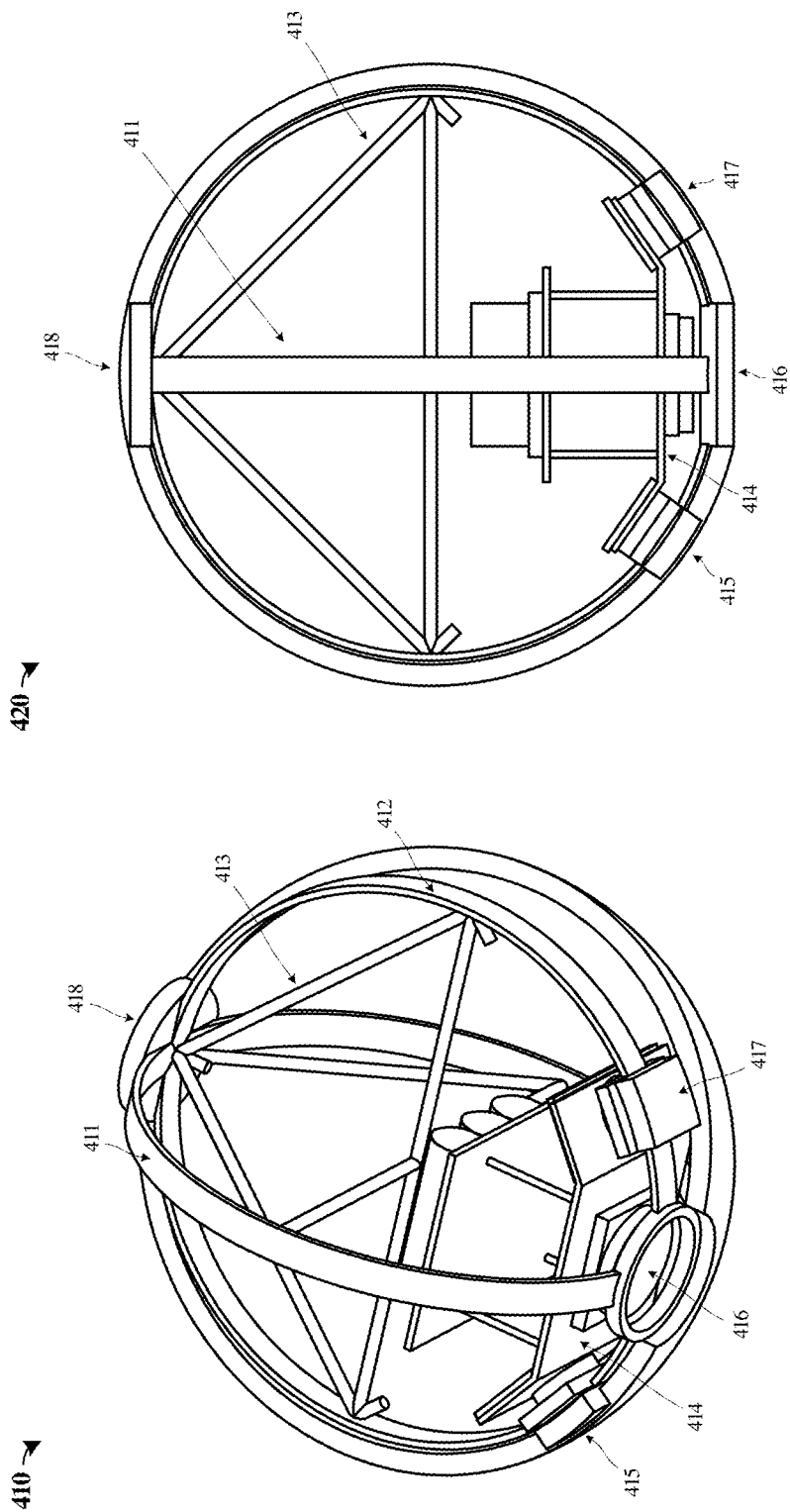
FIG. 4 illustrates exemplary aspects of internal structures of a spherical probe used in an implementation.

FIG. 4 illustrates exemplary aspects of internal structures of a spherical probe that includes a frame or exoskeleton to protect and rotate internal components about a shell. FIG. 4 includes aspects 410 and 420, which further include rotatable frames 411 and 412, internal frame 413, landing structure 414, imaging sensors 415, 416, and 417, and omnidirectional antenna 418.

The structural frames illustrated in aspects 410 and 420 remain inside a hardened spherical shell and function as an internal exoskeleton to support impact transfer loads. Rotatable frames 411 and 412 and internal frame 413 provide additional reinforcement during a landing phase on a surface. In various embodiments, both frames can be made from a metallic alloy. Alternatively, the frames can be formed from another alloy, metal, composite, or other durable material. Within the outer shell, rotatable frames 411 and 412 can rotate about an axis to ensure the components affixed to landing structure 414 remain upright or in a preferred orientation after impact.

Imaging sensors 415, 416, and 417 are configured to capture image or video data of the targeted area during a landing phase and after impact. The probe comprises other internal components mounted on landing structure 414 which can comprise a battery pack, science instrumentation, an accelerometer, light-emitting diodes, and a processing system. Rotatable frames 411 and 412 allow the components to align with apertures or viewports affixed to an outer shell. Through the apertures, the instruments can obtain surface, airborne, and similar data from the target area. Omnidirectional antenna 418 can be configured to transmit captured data to a deployer/lander vehicle, a host spacecraft, ground station, or some other hub via wireless transmissions.

Figure 5:
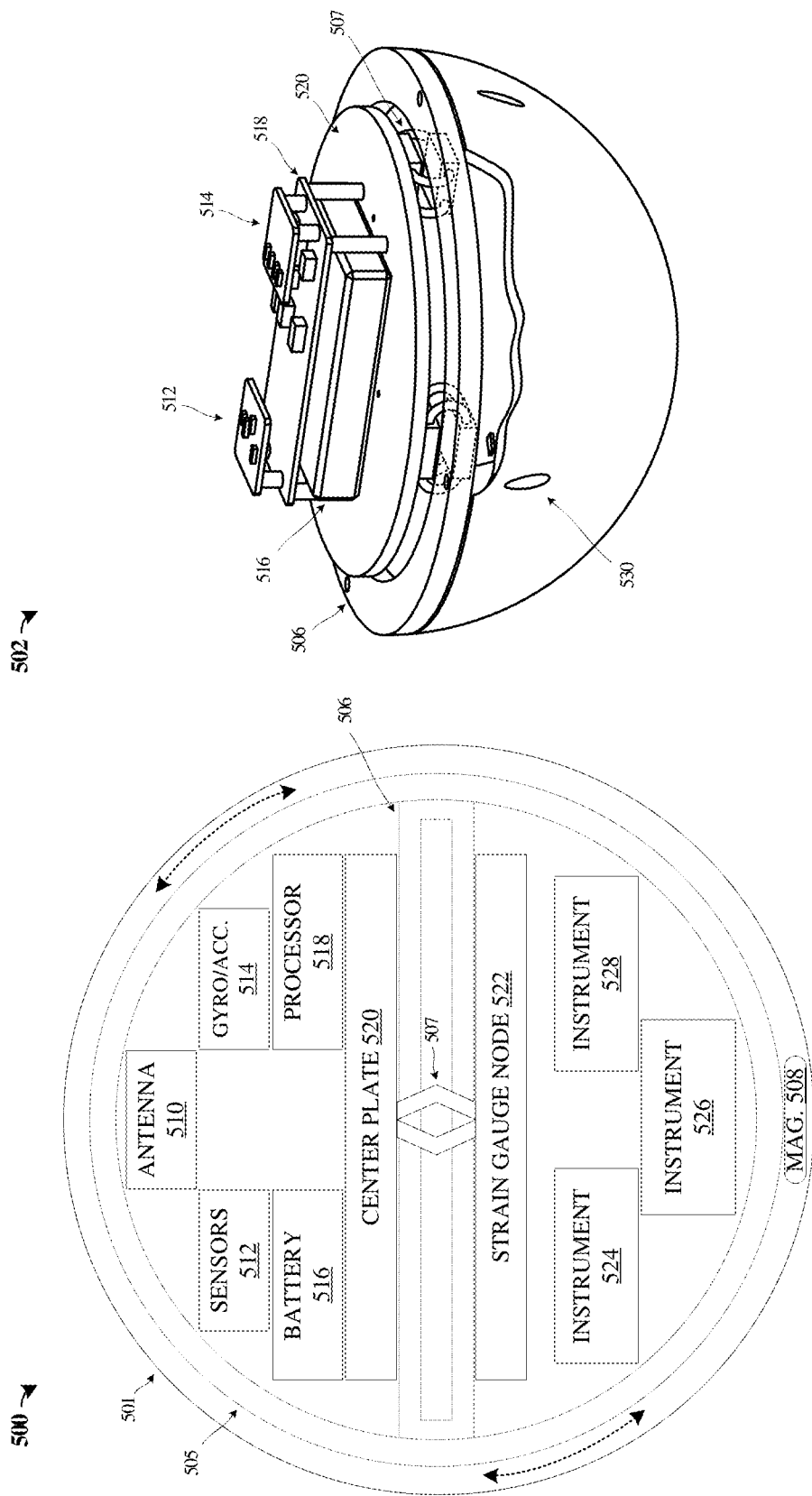
FIG. 5 illustrates exemplary aspects of internal components of a spherical probe used in an implementation.

FIG. 5 illustrates exemplary aspects of internal components of a spherical probe used as part of a payload swarm. FIG. 5 includes block-diagram aspect 500 and internal cross-sectional aspect 502 which further includes various avionics and hardware components configured to carry out mission objections according to the telemetry desired during a swarm deployment.

Turning first to block-diagram aspect 500, this example includes outer shell 501, gyroscopic frames 505 and 506, wire-rope shock isolator 507, magnet 508, antenna 510, sensors 512, gyroscope/accelerometer 514, battery 516, processor 518, center plate 520, strain gauge node 522, and instruments 524, 526, and 528. Outer shell 501 can comprise a hardened multi-ply material with several apertures for imaging or sensor windows. The inner shell comprises a frictionless gyroscopic exoskeleton (e.g., rotatable frames 505 and 506) that allows the internal components to rotate about axes during and after an impact on a surface. After a spherical probe has settled on the surface, magnet 508 helps rotatable frame 505 remain in a preferred position so that the electronic components and payloads, such as sensors 512 and instruments 524, 526, and 528, align with an aperture (not shown in Figure on outer shell 501. Also, ball bearings may be included in the exoskeleton for rotation or orientation of components within the inner shell.

During mission operations, avionics circuitry depicted in block-diagram aspect 500 can be customized to capture scientific data about the target area and relay captured information and probe status via a communication network to other probes and/or a deployer. In one section of the probe, center plate 520 provides a housing structure and mounting points for various components, including sensors 512, gyroscope/accelerometer 514, battery 516, and processor 518. In various embodiments, sensors 512 comprise a spectrometer, a thermal sensor, a seismometer, light-emitting diodes, and the like; battery 516 may comprise a lithium polymer battery or the like; and gyroscope/accelerometer may be configured to determine at least a trajectory of the probe's landing position, the probe's velocity, an orientation of the probe upon landing, and more. In another section of the probe, instruments 524, 526, and 528 can be fixed directly to rotatable frame 505. Each payload can be configured to capture scientific data, optical data, and the like. For example, one or more of instruments 524, 526, and 528 can be cameras or optical sensors configured to obtain image or video data throughout the life of the mission, such as after deployment during descent, during impact, and post-impact. In other instances, one or more of instruments 524, 526, and 528 can be another type of sensor, or any combination thereof. Each instrument can be operatively coupled to processor 518. Processor 518 can be configured to transmit captured data and information about the probe and/or to receive information from other devices via antenna 510. Antenna 510 may operate in an X-band frequency range, an S-band range, or some other wireless communication protocol.

Center plate 520 may be fixed to rotatable frame 506 to allow the components to maintain a position inside the internal shell. Center plate 520 and strain gauge node 522 can be coupled by one or more of wire-rope shock isolator 507. Wire-rope shock isolator 507 helps isolate vibrations and absorb impacts during the landing phase wherein the probe impacts, rolls, and/or bounces on the surface.

Similarly, internal cross-sectional aspect 502, comprising the same components as block-diagram aspect 500, demonstrates a three-dimensional model of the avionics, hardware, and electrical equipment located inside of a spherical probe used in various implementations. Further depicted in aspect 502 is aperture 530. Aperture 530 is a transparent viewport wherein a sensor, instrument, or camera, for example, can take measurements or capture data from the area outside the probe. In various implementations, aperture 530 can be formed from polyurethane, glass, or other similar material transparent to the optical frequencies under measurement.

Figure 6:
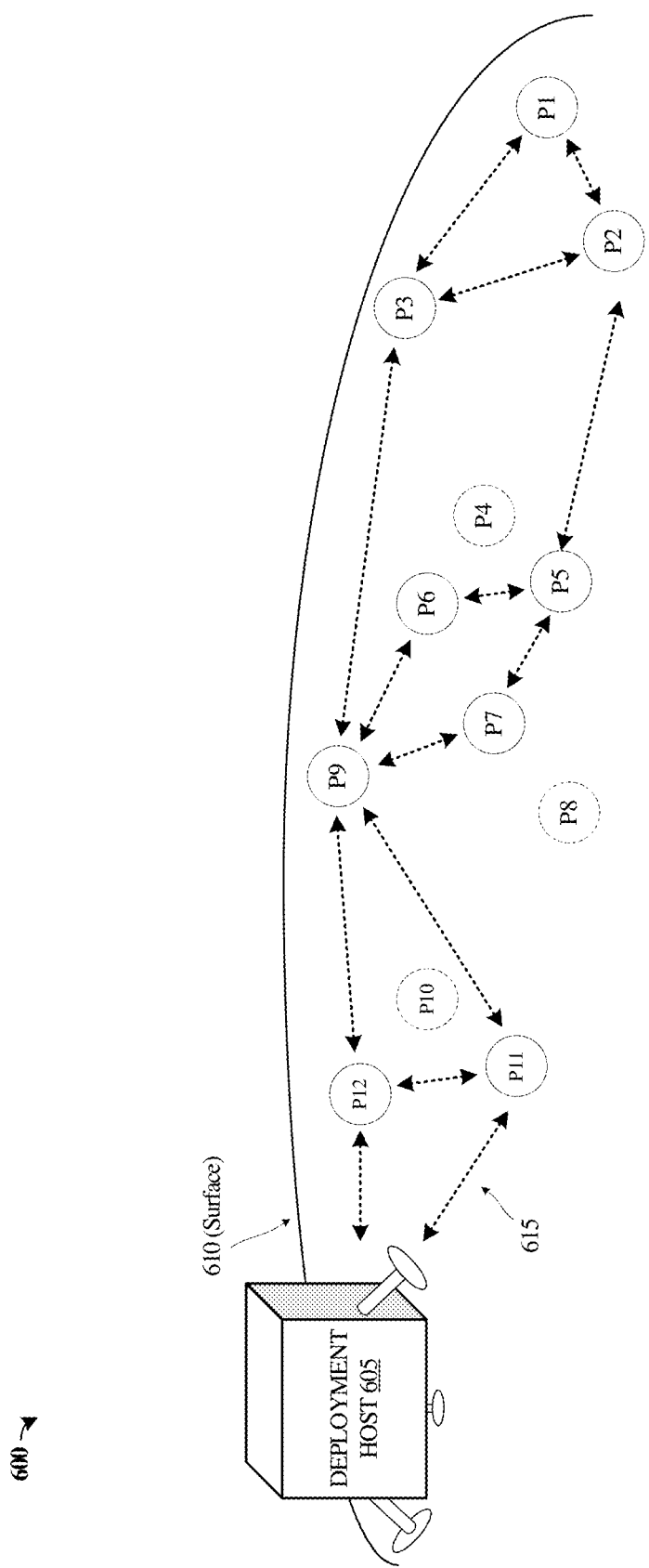
FIG. 6 illustrates an exemplary operating environment demonstrating a communication network established between a payload swarm in an implementation.

FIG. 6 illustrates an exemplary operating environment demonstrating a functional communication network established among a swarm of probes and a lander vehicle. FIG. 6 includes operating environment 600, which further includes deployment host 605, a swarm of probes (e.g., P1-P12) located on surface 610, and routing calls 615 throughout the mesh network created by the swarm. For example, the communication framework can be established by each payload group 116-119 and deployment host 115 of FIG. 1. Also, the communication network can be utilized in operations 200 of FIG. 2.

Operating environment 600 depicts a time after deployment host 605 has sequentially distributed a swarm of twelve spherical probes for impact onto surface 610 and has landed on surface 610. Surface 610 may be a lunar surface, a celestial body, or other terrestrial object, and it may include craters, PSRs, and regions with varying topography. Each probe, whether deployed individually, in sets, or some other fashion, can impact surface 610 at a different time and location. Thus, a large area of surface 610 can be covered and analyzed by the swarm. As illustrated, deployment host 605 may have initially deployed a first group of probes including P1, P2, and P3 for impact onto surface 610 farthest from deployment host 605. Probes that may have been deployed later, such as P10-12, may land closer to deployment host 605.

As probes begin to impact surface 610, each can begin initializing communications systems and other telemetry. The probes can use onboard antennas to send signals to other probes and deployment host 605 to determine the status and location of the other devices. Each responsive device can form a communication network via wireless communication and routing protocols to achieve a mesh operation based on either proximity or optimal line of sight to the hose vehicle. This communication network can comprise an autonomous, self-managing, decentralized, and ad hoc network that periodically sends "Health and Status" messages between the probes and deployment host 605. Data transferred by the probes can include instrument operability, internal temperature, and battery level, among other internal component status.

In operating environment 600, routing calls 615 depict communication links established between probes. The paths for each of routing calls 615 can be determined by analyzing several factors, including but not limited to the validity of the path, a probe transmission readiness status, a distance from one probe to the nearest active/available probe, and a power level of a recipient probe. In an example, probes P1, P2, and P3, each land in proximity and have a line of sight to communicate with each other, so routing calls 615 are established between the three probes upon an indication of a valid route and receipt of a route request. Next, probe P4 may have failed upon impact, landed in an unreachable area of surface 610, or lost power, so it cannot establish a valid routing path in the network. However, probe P5 can establish a link with P2, so it can access each of probes P1, P2, and P3, data and status. Closer to deployment host 605, both probes P11 and P12 can establish a communication link to uplink/downlink data transmitted through the mesh network of the swarm. Deployment host 605 may transmit operation commands for each probe according to the probe's reported status or current operation. In other instances, each probe may have a pre-programmed mission operation, stored in local memory, which when implemented, directs it to perform at least a function depending on a status of the probe.

Failure of a probe or imminent battery depletion can result in indications of invalid routes or, alternatively, lack of an indication from such a probe. To mitigate failures, the active probes can reroute communication paths to remove any failed/inactive/unavailable probes from the communication network. This can be accomplished proactively, whereby a probe communicates a status indicating a low battery level to other probes, and the other probes establish new communication paths without incorporating the depleted probe. Mitigation can occur reactively after a probe is no longer communicative with other probes. The other probes can determine the previously used communication path is invalid and can establish updated paths. For example, if probe P2 lost connection to the network due to battery depletion, P1, P3, and P5 may anticipate a failure and establish new communication routes in preparation for P2's exit from the network. Thus, loss of one or more probes can still produce routable communication pathways through active/reachable probes via self-managing, autonomous networking.

Figure 7:
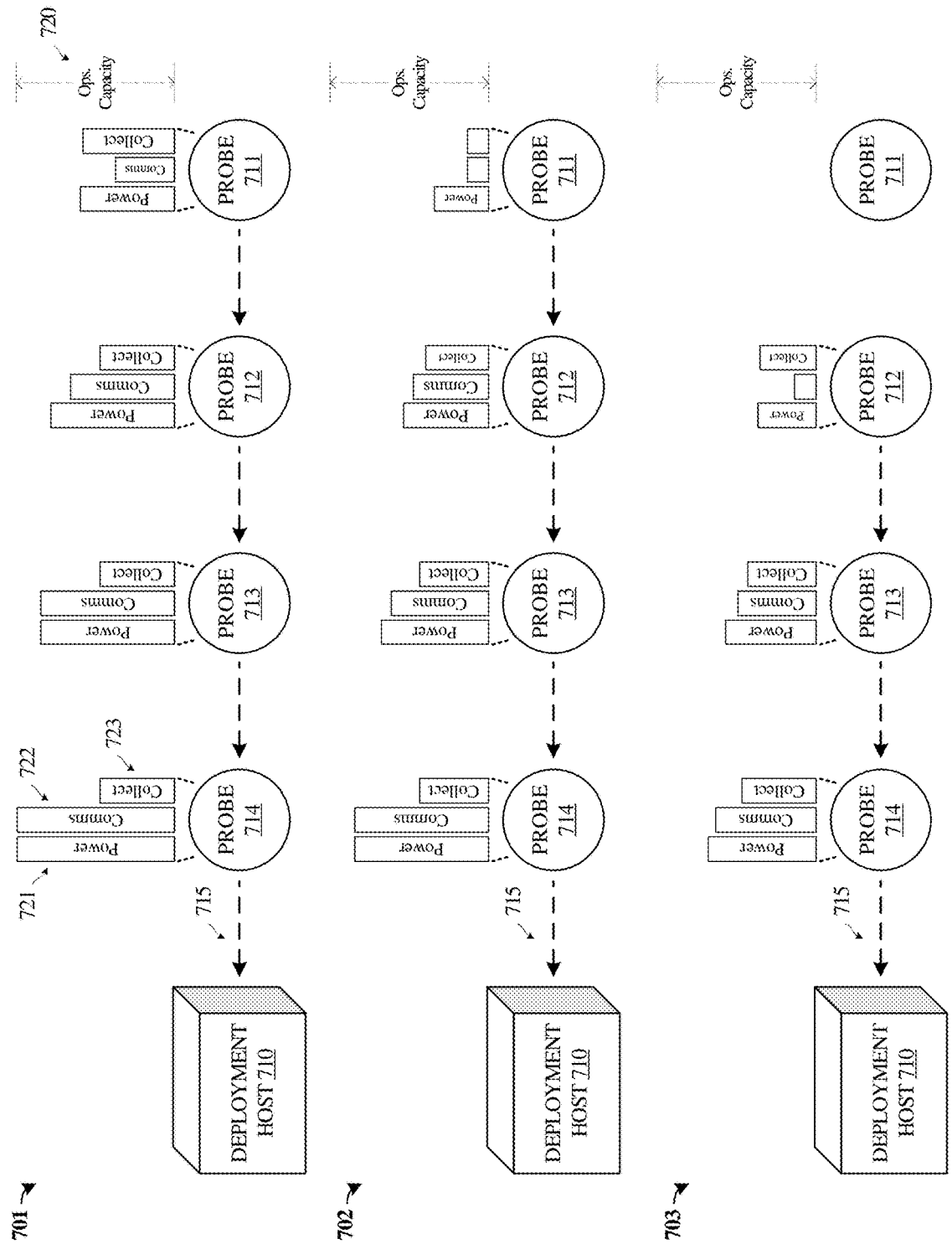
FIG. 7 illustrates an exemplary operations and communications lifecycle over the duration of a payload swarm mission in an implementation.

FIG. 7 illustrates three exemplary operations and communications timeframes over the duration of a payload swarm mission. Each timeframe 701, 702, and 703 demonstrates a communication network established among four deployed spherical probes 711-714 and a deployment host 710 via communication link 715. Status, or operations capacity 720, for each probe is shown for power 721, communication 722, and science payloads, or collection 723 during the mission timeline. In various embodiments, collection 723 refers to the capture of scientific or technical data from the impacted surface, such as thermal sensing, spectroscopy, image sensing, and more.

In first timeframe 701, each probe 711-714 establish a communication network amongst each other and deployment host 710 after impacting onto a surface. Prior to first timeframe 701, during deployment, deployment host 710 can individually and sequentially launch each probe for distribution onto the surface. Accordingly, probe 711 impacts the surface first, probe 712 impacts the surface at a time after, and so on. Thus, probe 711 may have a lower operations capacity 720 than other probes in the swarm because it has utilized its power 721 before other probes.

Using the communication network established, the probes can transmit and receive messages, such as status and operations capacity 720, and data captured using scientific instruments onboard each probe. Because probe 711 impacts and begins its mission first, it may be configured to focus its operations capacity 720 mostly on collection 723 of data. A smaller amount of power can be focused on communication 722 with other probes. Next, probe 712 may focus slightly less on collection 723 and utilize power towards communication 722 to relay information from probe 711 to other probes and deployment host 710. Following the trend, probes 713 and 714 can be configured to collect less data during timeframe 701 than probes 711 and 712 given a need to ensure as much collected data as possible is relayed to deployment host 710.

In second timeframe 702, each probe 711-714 actively provides telemetry and is depleting on-board batteries accordingly. Overall, operations capacity 720 is diminished at least slightly more than in first timeframe 701. For example, probe 711 has little power 721 remaining, so it may be configured to reduce to minimal communication 722 and collection 723 operations. Thus, probe 711 can primarily focus on transmitting its collected data through the network via communication link 711. In some embodiments, probes 712-714 can be configured to utilize the same operations capacity 720 as in first timeframe 701, or they may be configured to re-route a remaining battery capacity to a desired setting.

In third timeframe 703, battery power has further diminished for each probe, and consequently, probe 711 is eliminated from the communication arrangement as it has lost power and gone inactive. As a result, probe 712 may be configured to receive probe 711's status and update its own operations capacity 720 to re-route remaining power to collection 723 operations while using minimal energy to transmit data through the network. Eventually, probe 712 will lose power 721, so probe 713 can be configured to take over similar operations capacity 720, and so on, until each probe is decommissioned. Deployment host 710 can collect all data transmitted from the probes, store it in local memory, and/or communicate the data downstream for later use. It may be appreciated that additional or fewer probes can be implemented for use in the deployment and collection mission.

Figure 8:
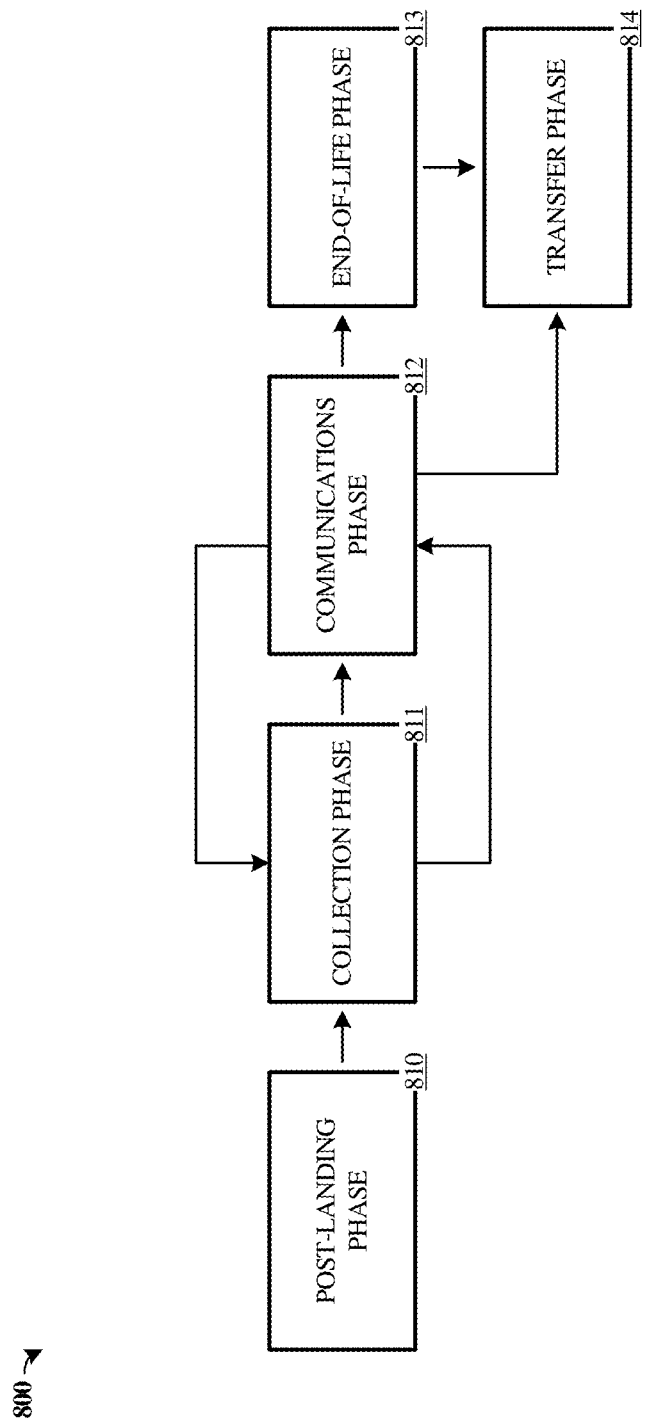
FIG. 8 illustrates a payload operations lifecycle in an implementation.

FIG. 8 illustrates an example payload operations lifecycle utilized by a swarm of spherical probes in an implementation, such as payload groups 116-119 of FIG. 1 and probes 711-714 of FIG. 7. FIG. 8 includes operations 800 noted parenthetically in the discussion below and which reference elements of FIG. 1.

In operation 810, the payload swarm, including payload groups 116-119 and deployment host 115, enter post-landing phase (810), wherein each probe settles after an impact and begins establishing a communication network amongst the probes and deployment host 115. During operation 810, each probe can determine its health and status after impact to evaluate if equipment on-board the probe suffered damage because of the impact.

In operations 811 and 812, each probe of payload groups 116-119 can switch between collection of telemetry data, as in collection phase (811), and transmission of the telemetry data, as in communications phase (812), until on-board batteries have been depleted below a target level. In the event a probe reaches a critical battery level while still accumulating data in the collection phase, the probe can autonomously switch to transmission phase to preserve enough battery time to transfer data prior to end of life. In collection phase (811), each probe may be configured to perform scientific data collection using on-board instrumentation such as thermal sensors, spectrometers, imaging sensors, and the like. Either concurrently or subsequently to collection phase (811), each probe can transmit collected data through an established mesh-type network through wireless communication links during communications phase (812). Each probe may transmit its collected data and status through another probe or directly to deployment host 115, which can store the data.

In operation 813, wherein one or more probes of payload groups 116-119 have reached the end-of-life phase (813), the probes can be configured to stop collecting data and use any remaining battery to transmit its health/status and data through the communication network. During this phase (813), probes in good health can continue their mission operations and re-route messages and data accordingly knowing that a depleted probe may go inactive. End-of-life phase (813) can continue for each probe until on-board batteries are completed or until transfer phase (814) begins.

In operation 814, each probe of payload groups 116-119 push data to deployment host 115, and deployment host 115 transmits all data to a second location, such as host spacecraft 110, command 105, or some other ground station. Transfer phase (814) can occur after end-of-life phase (813) wherein each probe has depleted its energy supply and has gone inactive, or after communications phase (812) upon an indication of sufficient data capture. Transfer phase (814) may also be dependent on an indication of downlink availability, which can be received by deployment host 115 from host spacecraft 110, command 105, or another remote communication.

Figure 9:
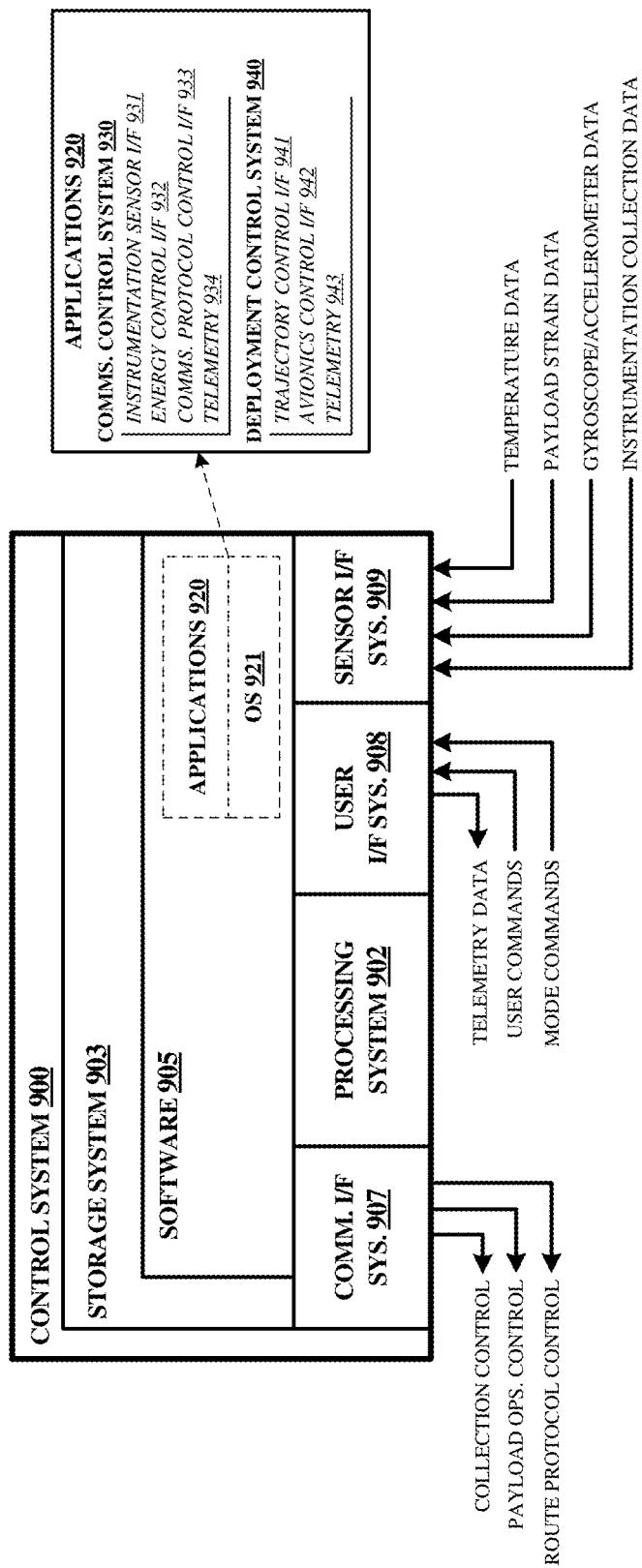
FIG. 9 illustrates a communication control system in an implementation.

FIG. 9 illustrates control system 900 and associated software 905 in an implementation. FIG. 9 illustrates control system 900 that is representative of any system or collection of systems in which the various operational architectures, scenarios, and processes disclosed herein may be implemented. For example, control system 900 can be used to implement elements of host spacecraft 110, deployment host 115, and probes of payload groups 116-119 of FIG. 1, deployment host 605 and probe swarm of FIG. 6 or elements of deployment host 710 and probes 711-714 of FIG. 7.

Control system 900 may be implemented as a single apparatus, system, or device or may be implemented in a distributed manner as multiple apparatuses, systems, or devices. Control system 900 includes, but is not limited to, processing system 902, storage system 903, software 905, communication interface system 907, user interface system 908, and sensor interface system 909. Processing system 902 is operatively coupled with storage system 903, communication interface system 907, user interface system 908, and sensor interface system 909.

Processing system 902 loads and executes software 905 from storage system 903. Software 905 includes applications 920, which are representative of the processes, services, and platforms discussed with respect to the included Figures. When executed by processing system 902 to deploy multiple sets of probes for impact onto a surface, wherein the sets of probes are configured to sense one or more properties of the surface and establish a communication network among the sets of probes, among other services, software 905 directs processing system 902 to operate as described herein for at least the various processes, operational scenarios, and sequences discussed in the foregoing implementations. Control system 900 may optionally include additional devices, features, or functionality not discussed for purposes of brevity.

Referring still to FIG. 9, processing system 902 may comprise a micro-processor and processing circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions comprising applications 920 and operating system 921 that provide control of a payload swarm and deployment host, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include applications 920. Software 905 may also comprise firmware or some other form of machine-readable processing instructions executable by processing system 902.

Software 905, when loaded into processing system 902 and executed, may transform a suitable apparatus, system, or device (of which control system 900 is representative) overall from a general-purpose computing system into a special-purpose computing system customized to provide control of a payload swarm and control of a deployment host, among other services. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors. For example, if the computer-readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 920 can include communications control system 930 and deployment control system 940. Communications control system 930 includes instrumentation sensor interface 931, energy control interface 932, communications protocol interface 933, and telemetry 934. Deployment control system 940 includes trajectory control interface 941, avionics control interface 942, and telemetry 943.

Turning first to communications control system 930, instrumentation sensor interface 931 is configured to communicate with elements of a payload probe, such as imaging sensors, spectrometers, thermal sensors, optical imagers, or other sensing equipment and scientific tools. Instrumentation sensor interface 931 can direct operation of a probe and control the operations of such elements to collect data from an impacted surface. Energy control interface 932 is configured to determine a remaining power level of a payload probe. Communications protocol control interface 933 is configured to establish a communication network among a set of probes and a deployment host. Communications protocol control interface 933 can direct operation of an on-board antenna to transmit/receive messages from other probes or the deployment host. Further, the interface can be configured to re-route messages upon an indication of failure or end of life of one or more probes in the communication network. Telemetry 934 can be configured to collect and store instrumentation data for further transfer during operations of a payload swarm.

Turning next to deployment control system 940, trajectory control interface is configured to determine at least a projected velocity and impact zone of a payload swarm and deployment host vehicle on a surface. Further, trajectory control interface can use a deployment schedule to determine landing information for each probe in the swarm, such as angle of impact, velocity at impact, and distance from deployment host, among others. Avionics control interface 942 is configured to enable operation of onboard probe instruments during descent and after impact, such as optical imagers, sensors, gyroscopic/accelerometer, and other elements. Telemetry 943 utilizes the suite of instrumentation onboard a probe to collect data controlled by avionics control interface 942, communicate with other probes, a deployment host or other command hub, and otherwise carry out mission objectives disclosed herein. For example, upon impact, telemetry 943 can be configured to obtain accelerometer data from a probe to determine an orientation and position of the probe (relative to a lander on/at a celestial body) with respect to other probes and the deployment host in order to establish a communication network amongst the swarm.

Communication interface system 907 may include communication connections and devices that allow for communication with other computing systems or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 907 can provide collection control, payload operations control and routing protocol control to probes in the payload swarm, a deployment host, or other devices.

Communication interface system 907 may include portions of sensor system interface 909. Sensor system interface 909 comprises various hardware and software elements for interfacing with payload instrumentation, avionics, sensors, or other probe and science devices. For example, sensor system interface 909 can receive or obtain temperature data, payload strain data, gyroscope and/or accelerometer data, instrumentation collection data, other science data, and the like. Data processing elements or other equipment can be included in sensor system interface 909.

Communication between communication control system 900 and other elements or systems (not shown), may occur over communication links or communication networks and in accordance with various communication protocols, combinations of protocols, or variations thereof. For example, communication control system 900 when implementing a control device, might communicate with sensor elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv9, etc. . . . ), the transmission control protocol (TCP), and the user datagram protocol (UDP), as well as any other suitable communication protocol, variation, or combination thereof.

User interface system 908 may include a software or virtual interface such as a terminal interface, command line interface, or application programming interface (API). User interface system 908 may also include physical user interfaces, such as keyboard, a mouse, a voice input device, or a touchscreen input device for receiving input from a user. User interface system 908 may include telemetry interfaces, user command controls, and payload operation mode command controls, such as collections operations and communications operations, among others. Output devices such as displays, web interfaces, terminal interfaces, and other types of output devices may also be included in user interface system 908. User interface system 908 can provide output and receive input over a network interface, such as communication interface system 907. In network examples, user interface system 908 might packetize data for receipt by a display system or computing system coupled over one or more network interfaces. User interface system 908 may comprise API elements for interfacing with users, other data systems, other user devices, web interfaces, and the like. User interface system 908 may also include associated user interface software executable by processing system 902 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:
    an outer shell comprising a generally spherical shell structure having a viewport and configured to protect an internal volume against external environmental intrusion;
    an impact structure affixed to an interior of the outer shell and continuing the viewport to the internal volume, the impact structure comprising an exoskeletal frame and an impact absorption material surrounding a sensor assembly; and
    the sensor assembly positioned within the impact structure and comprising support frames rotatably coupled to the impact structure and having magnetic centering elements configured to rotate a sensor component about axes associated with the support frames to align the sensor component within the impact structure with the viewport provided by the impact structure and the outer shell;
    wherein the sensor component is configured to sense properties external to the outer shell through the viewport at least responsive to impact onto a surface after physical deployment from a host vehicle.

2. The apparatus of claim 1, wherein the sensor assembly comprises the sensor component powered by a battery and further comprises at least one among an antenna, an accelerometer, and a processor, each coupled to the support frames with the sensor component.

3. The apparatus of claim 1, wherein the sensor component comprises at least one among a spectrometer, a thermal sensor, and an optical sensor configured to sense properties external to the outer shell through at least the viewport.

4. The apparatus of claim 1, wherein the impact structure comprises wiring passthroughs that couple elements on the sensor assembly to elements external to the impact structure and allow rotation of the sensor assembly relative to the elements external to the impact structure.

5. The apparatus of claim 1, comprising:
 the sensor assembly comprising communication circuitry configured to initiate a communication link in a network among at least one probe device co-deployed from the host vehicle.

6. The apparatus of claim 1, wherein the aperture comprises a window configured to provide a line of sight from the sensor component to an environment external to the outer shell and formed from a material transparent to optical frequencies under measurement.

7. The apparatus of claim 1, wherein the impact absorption material comprises a honeycomb crushable sub-structure continuing the viewport; and
 wherein the outer shell comprises a two-piece shell surrounding the impact structure.

* * * * *